March 2, 1965     W. D. ALLISON     3,171,642
VEHICLE WHEEL SUSPENSION HAVING LATERAL COMPLIANCE
Filed June 30, 1961     3 Sheets-Sheet 1
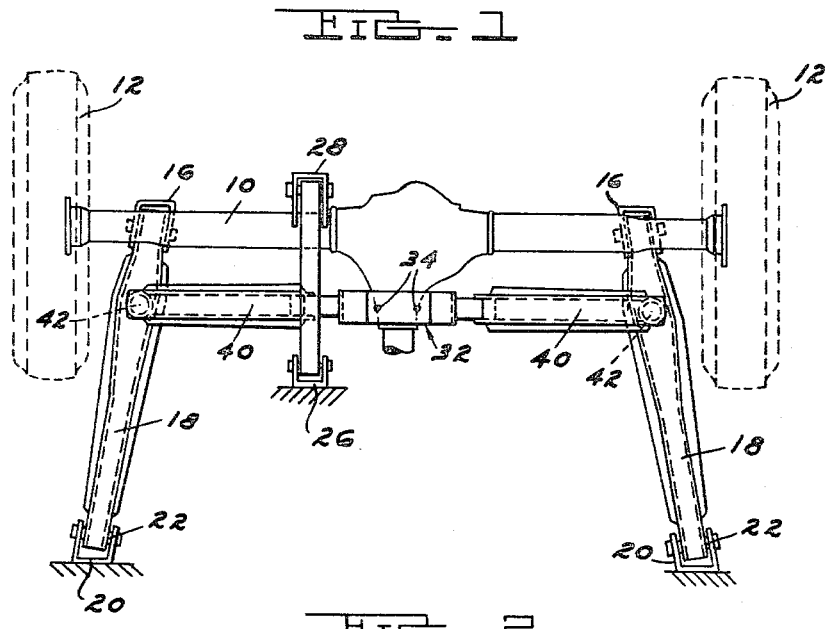
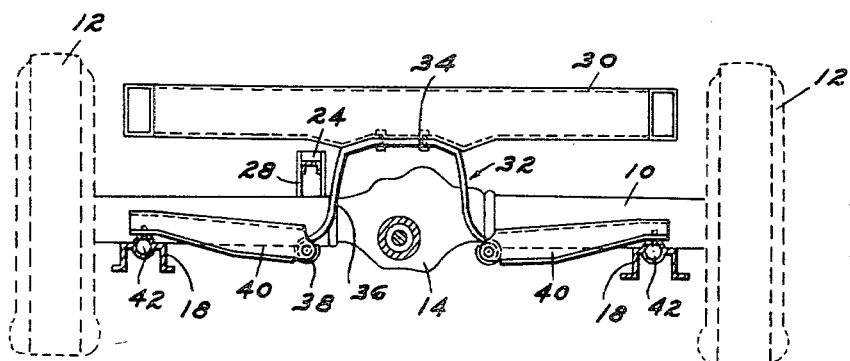
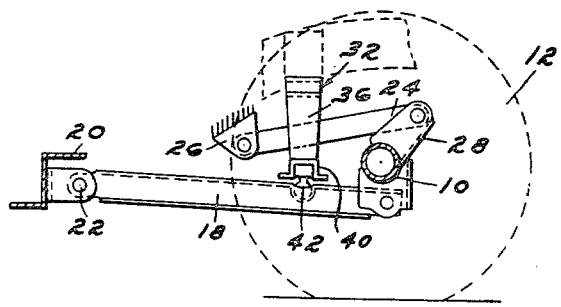
WILLIAM D. ALLISON
INVENTOR.
BY John R. Faulkner
Clifford L. Sadler
ATTORNEYS March 2, 1965  W. D. ALLISON  3,171,642
VEHICLE WHEEL SUSPENSION HAVING LATERAL COMPLIANCE
Filed June 30, 1961  3 Sheets-Sheet 2
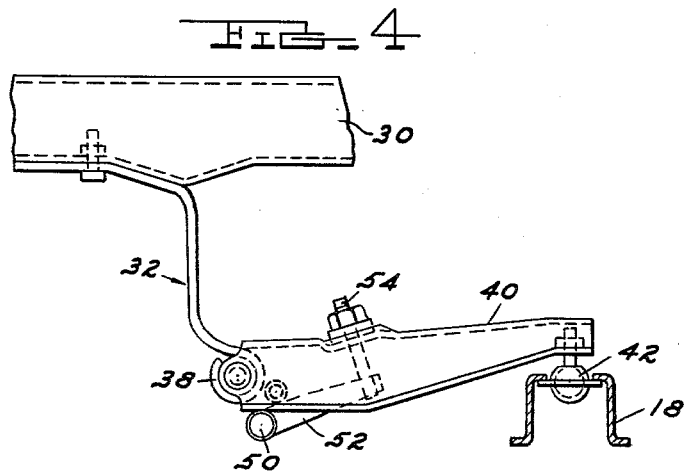
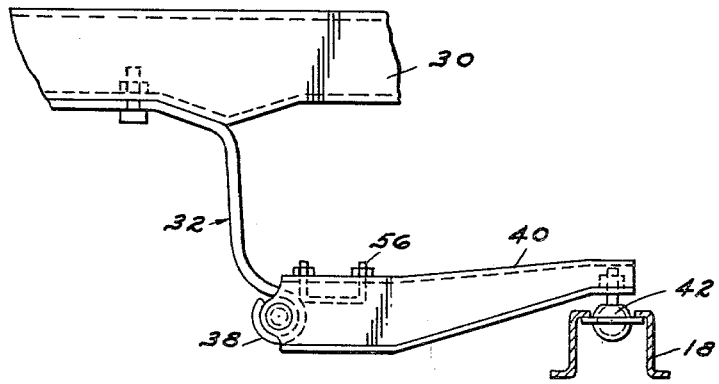
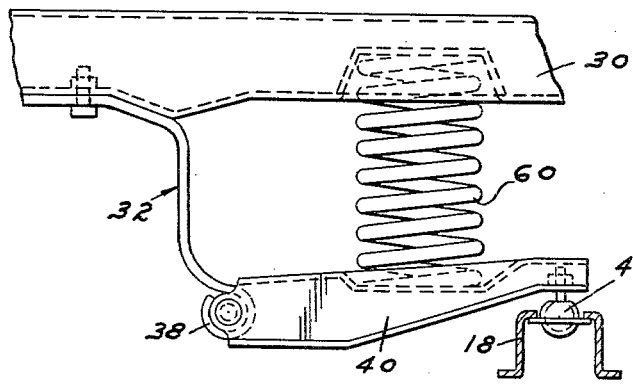
WILLIAM D. ALLISON
INVENTOR.
BY John R. Faulkner
Clifford L. Sadler
ATTORNEYS March 2, 1965 W. D. ALLISON 3,171,642
VEHICLE WHEEL SUSPENSION HAVING LATERAL COMPLIANCE
Filed June 30, 1961 3 Sheets-Sheet 3
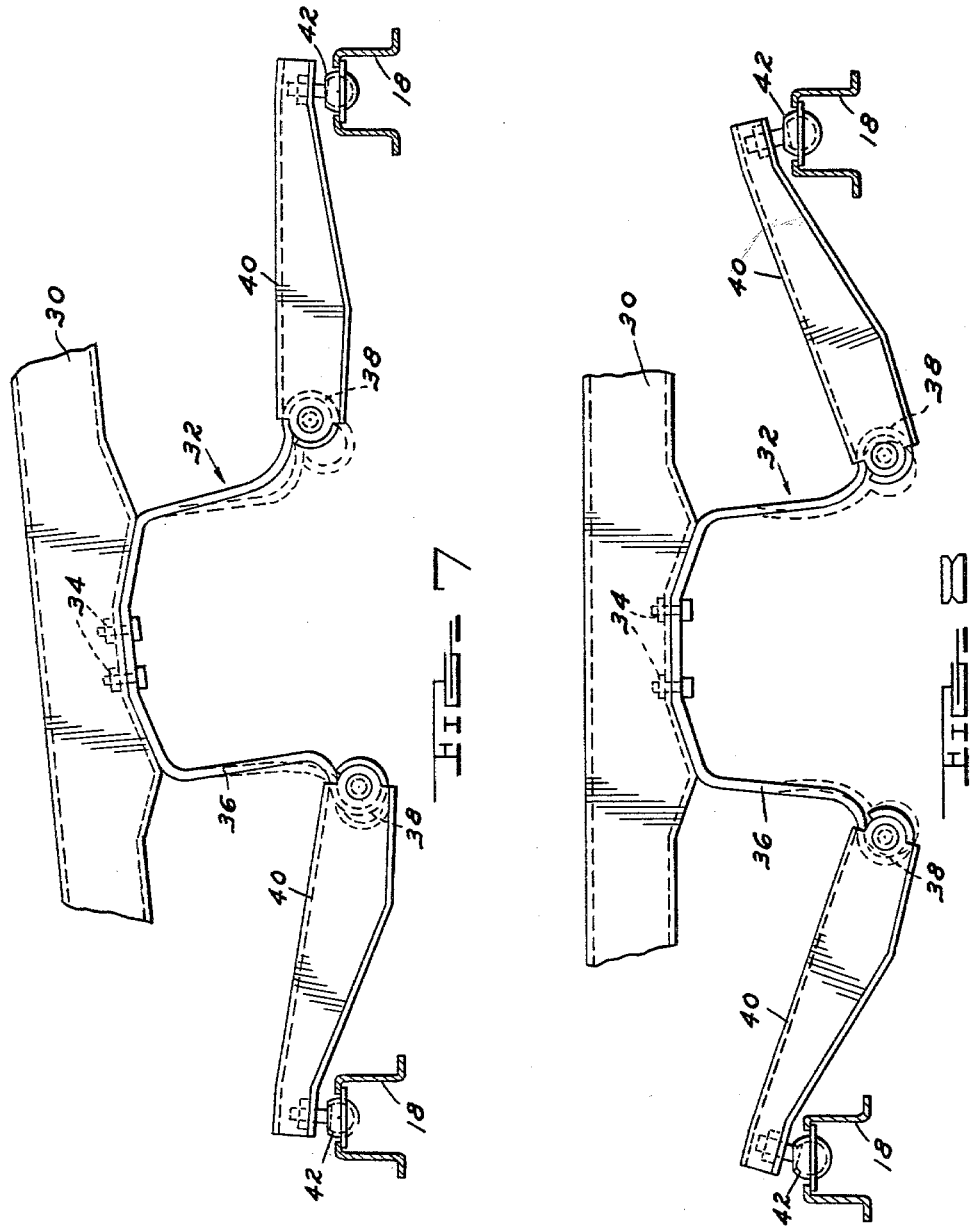
WILLIAM D. ALLISON
INVENTOR.
BY John R. Faulkner
Clifford L. Sadler
ATTORNEYS

United States Patent Office 3,171,642
Patented Mar. 2, 1965

3,171,642
VEHICLE WHEEL SUSPENSION HAVING
LATERAL COMPLIANCE
William D. Allison, Grosse Pointe Farms, Mich., assignor to Ford Motor Company, Dearborn, Mich., a corporation of Delaware
Filed June 30, 1961, Ser. No. 121,059
13 Claims. (Cl. 267—20)

The present invention relates to suspension systems and more particularly to a vehicle suspension having lateral flexibility.

The basic objective of automobile suspension design is to provide a spring supported vehicle which receives a minimum amount of disturbance from road irregularities and has a maximum amount of controllability. These features are not always compatible. In conventional suspension structures a soft ride usually leads to instability at high vehicle speeds or loss of precise cornering control. Similarly, a suspension system having exceptional vehicle control characteristics is usually accompanied by harsh ride.

In view of the state of the art, it is an object of the present invention to provide a vehicle suspension structure which has both soft ride characteristics and good road handling qualities.

It is also an object of the present invention to provide a vehicle suspension system having controlled lateral flexibility or compliance between the axle and body for the purpose of reducing harshness and improving road holding ability. The present invention also includes under-steer geometry responsive to vehicle side loading as a result of the lateral movement of the axle.

It is a further object to provide by the same suspension structure track linkage or linkage to position the axle laterally relative to the body.

It is another object of the invention to have a suspension structure capable of limiting the downward movement of the axle.

Other advantages include a rear suspension system having a load arm arrangement suitable for a wide variety of spring types or combinations.

More specifically, the present invention provides a rear suspension system for a solid axle in which trailing arms connect the chassis and axle. The arms are canted to extend forwardly and outwardly from the axle. A single upper arm links the chassis with the axle also. A yoke-shaped spring element is positioned in front of the differential housing and has depending ends that are joined to the trailing arms by load arms.

These and further objects of the present invention will be more fully understood from the following discussion and the accompanying drawings in which:

FIGURE 1 is a top plan view of a suspension system constructed in accordance with the present invention;

FIGURE 2 is a front elevational view of the suspension of FIGURE 1;

FIGURE 3 is a side elevational view of the suspension of FIGURE 1;

FIGURE 4 is an elevational view of a form of the suspension of FIGURE 2 incorporating a torsion bar spring;

FIGURE 5 is an elevational view of a modification of the suspension of FIGURE 2 incorporating a flat leaf spring loaded in torsion;

FIGURE 6 is an elevational view of another modification of the suspension of FIGURE 2 incorporating a coil spring; and, FIGURES 7 and 8 show the suspension of the present invention in conditions of side force loading and jounce position respectively.

Referring now to the drawings wherein the presently preferred embodiments of this invention are disclosed, like reference numerals identify like parts throughout the various views. FIGURE 1 discloses a suspension for a solid rear axle housing 10 to which driving wheels 12 are rotatably mounted. The axle housing 10 has a differential 14 situated at its midpoint.

The axle 10 has a pair of brackets 16 extending downwardly therefrom and positioned inwardly from each of the wheels 12. Each of the brackets 16 pivotally supports a trailing arm 18. Arms 18 extend forwardly and outwardly from the brackets 16 and are pivotally secured to vehicle body structure 20 by a pivotal support or bracket 22.

A longitudinally extending upper arm 24 is pivotally connected to a body mounted bracket 26 and extends rearwardly therefrom for connection to a bracket 28 that stands upwardly and rearwardly from the axle housing 10. The upper arm 24 is positioned to the right of the vehicle's center line.

A cross-frame member 30 is part of the sprung vehicle body structure and supports a yoke shaped spring member formed of flat leaf spring stock, by a pair of bolts 34. The yoke spring is identified by the reference numeral 32. The spring 32 is situated forwardly of the axle housing 10 and has depending leg portions 36 that straddle part of the differential 14. The ends of the leg portions 36 terminate in spring eyes 38.

Laterally extending load arms 40 are pivotally connected to the eyes 38 by means of bushings. The outer ends of the arms 40 are secured to the trailing arms 18 by ball and socket joints 42 to permit universal movement. Due to the flexibility of the leg portions 36 of the yoke spring 32, the lateral load arms 40 are permitted slight side to side or lateral movement. The rubber bushings at the fore and aft ends of the trailing arms 18 and upper arm 24 do not resist this slight lateral movement.

The main suspension spring may be interposed in the system at the load arm 40. FIGURES 4, 5 and 6 disclose typical installations of such springs. In FIGURE 4 a torsion bar 50 having a short load arm 52 is secured to the arm 40 by a U-bolt 54. The opposite end of the torsion bar spring 50 is secured to a sprung vehicle body member. A similar construction is shown in FIGURE 5 where U-bolt 56 is designed to receive a torsion spring formed of flat leaf spring stock. In both FIGURES 4 and 5 the torsion spring is loaded by the pivotal movement of the arm 40 to resiliently support the vehicle body on the unsprung portion of the suspension.

In FIGURE 6 the main suspension spring is a coil spring 60 which is interposed between spring seats carried by the cross-frame member 30 and the arm 40. Oscillatory movement of the arms 40 acts directly on the suspension spring 60.

As illustrated in FIGURES 4, 5 and 6, the load arms 40 provide a convenient means for installing a variety of rear chassis springs.

Thus, the foregoing structure provides an axle 10 that is located longitudinally by the two trailing arms 18 and the one upper link 24. The trailing arms 18 are splayed outwardly at their front ends so that any side movement of the axle 10 has a slight steering effect on the rear axle in the direction of under-steering.

The upper link 24 is offset to the right of the car center line and is inclined downwardly to the front. Upon acceleration it exerts a vertical force to the right side of the vehicle and helps reduce roll from engine torque. It also prevents the rear end of the vehicle from sinking on acceleration or rising excessively during severe braking.

The lateral location of the axle 10 is achieved by the yoke spring 32. The ends 36 of the spring 32 are tapered and extend downwardly and slightly outwardly and terminate in the spring eyes 38 as previously explained. Side forces on the vehicle, such as those occurring from centrifugal force, road camber or wind are transmitted through the depending legs 36, the load arms 40 and the trailing arms 18 to the axle 10 and the wheels 12. In one typical installation the lateral displacement resulting from a side force of 1000 pounds was calculated to be approximately three-fourths of one inch.

FIGURES 7 and 8 are presented to show the deflected position of the yoke spring 32 under certain conditions. In FIGURE 7 the effect of side forces is shown. The dotted representations of spring legs 36 disclose the lateral displacement of the suspension. Similarly, FIGURE 8 discloses the effects of jounce which cause both legs 36 to deflect outwardly.

A vehicle suspension constructed in accordance with the foregoing description will result in a substantial reduction of harshness. When one wheel on a solid axle strikes a bump or depression, the axle attempts to pivot about the tire contact point of the opposite wheel. The roll axis (point of attachment of suspension linkage to the body determining roll movement) is usually from nine to twelve inches above ground level at the rear axle. Individual vertical motions of either wheel imparts a lateral force to the body due to the elevation of the roll axis. Lateral compliance or flexibility allows this movement to be absorbed by the compliance of yoke spring 32, rather than to shake the body in a lateral direction.

The foregoing description presents the preferred embodiments of this invention. Modifications and alterations of this structure may occur to those skilled in the art which will come within the scope and spirit of the following claims.

I claim:

1. In a suspension system for a vehicle having sprung components, a solid axle and a pair of trailing arms connecting said axle to said components, spring means connected to said components and having laterally resilient extending end portions, laterally extending load arms interconnecting said end portions and said trailing arms, said spring means and said load arms combining to exert a lateral spring force upon said trailing arms.

2. The combination of claim 1 wherein said trailing arms diverge forwardly and outwardly from said axle.

3. In the combination of claim 1, a torsion bar suspension spring interposed between each of said load arms and said sprung components.

4. In the combination of claim 1, a coil suspension spring interposed between each of said load arms and said sprung components.

5. In the combination of claim 1, a leaf suspension spring interposed between each of said load arms and said sprung components.

6. A vehicle suspension system having sprung and unsprung components, first longitudinally extending suspension link means interconnecting said components and adapted to permit vertical jounce and rebound movement of said unsprung components relative to said sprung components, said first means being constructed to position said unsprung components longitudinally with respect to said sprung components, said first means being further adapted to permit lateral movement of said unsprung components relative to said sprung components, second suspension means interconnecting said first means and said sprung components and resiliently resisting lateral movement of said unsprung components.

7. A vehicle suspension system having sprung and unsprung components, first longitudinally extending suspension link means interconnecting said components and adapted to permit vertical jounce and rebound movement of said unsprung components relative to said sprung components, said first means being constructed to position said unsprung components longitudinally with respect to said sprung components, said means being further adapted to permit lateral movement of said unsprung components relative to said sprung components, spring means secured to said sprung components, second suspension means interconnecting said first means and said spring means, said spring means exerting a force through said second suspension means resiliently resisting lateral movement of said unsprung components.

8. A vehicle suspension system having sprung and unsprung components, a longitudinally extending support member interconnecting said sprung and unsprung components and adapted to permit vertical jounce and rebound movement of said unsprung components relative to said sprung components, said member being further adapted to permit lateral movement of said unsprung components relative to said sprung components, a spring member connected to said sprung components, a generally laterally extending support member pivotally connected to said longitudinally extending support member at one of its ends and to said spring at the other of its ends.

9. A vehicle suspension system having sprung components and an unsprung axle housing, a pair of generally longitudinally extending support members interconnecting said sprung components and said axle housing, said members being adapted to permit vertical jounce and rebound movement of said axle housing and further adapted to permit lateral movement of said axle housing, spring means connected to said sprung components at a point between said pair of members, a pair of laterally outwardly extending links pivotally connected at their inner ends to said spring means and at their outer ends to said longitudinally extending members.

10. A vehicle suspension system having sprung components and an unsprung axle housing, a pair of generally longitudinally extending support members interconnecting said sprung components and said axle housing, said members being adapted to permit jounce and rebound movement of said axle housing, laterally resilient spring means connected to said sprung components, a pair of laterally outwardly extending links pivotally connected at their inner ends to said spring means and at their outer ends to said longitudinally extending members, said spring means exerting a lateral spring force upon said links and said members.

11. In a suspension system for a vehicle having sprung components, a solid axle and a pair of trailing arms connecting said axle to said components, said trailing ends diverge forwardly and outwardly from said axle, a yoke shaped spring connected to said components and having depending end portions, laterally extending load arms interconnecting said end portions and said trailing arms.

12. In a suspension system for a vehicle having sprung components, an axle, and suspension arm means connecting said axle to said components and constructed for positioning said axle longitudinally with respect to said components, resilient linkage means interposed between said suspension arm means and said components constructed for positioning said axle laterally and adapted to permit slight resilient lateral movement of said components in response to a lateral force, said arm means being adapted to cant said axle to the center line of said vehicle in the direction of understeer upon said slight lateral movement of said axle.

13. In a suspension system for a vehicle having sprung components, a solid axle and a pair of suspension arms connecting said axle to said components, spring means connected to said components and having laterally resilient extending end portions, laterally extending load arms interconnecting said end portions and said suspension arms, said spring means and said load arms combining to exert a lateral spring force upon said suspension arms, said suspension arms diverge forwardly and outwardly relative to the vertical longitudinal center plane of the vehicle.

(References on following page)

References Cited in the file of this patent

UNITED STATES PATENTS

| | | |
|---|---|---|
| 1,556,931 | Halladay | Oct. 13, 1925 |
| 2,188,654 | Favary | Jan. 30, 1940 |
| 2,367,817 | Brown | Jan. 23, 1945 |
| 2,915,321 | Wilfert | Dec. 1, 1959 |
| 2,999,694 | Allison | Sept. 12, 1961 |
| 3,025,078 | Allison | Mar. 13, 1962 |

FOREIGN PATENTS

| | | |
|---|---|---|
| 625,224 | France | Apr. 19, 1927 |